US011327033B1

(12) United States Patent
Lu

(10) Patent No.: US 11,327,033 B1
(45) Date of Patent: May 10, 2022

(54) METHODS FOR DETECTING STABILITY OF X-RAY PHOTOELECTRON SPECTROMETER

(71) Applicant: CHANGXIN MEMORY TECHNOLOGIES, INC., Hefei (CN)

(72) Inventor: Pengpeng Lu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/431,771

(22) PCT Filed: Mar. 10, 2021

(86) PCT No.: PCT/CN2021/079864
§ 371 (c)(1),
(2) Date: Aug. 18, 2021

(87) PCT Pub. No.: WO2021/180099
PCT Pub. Date: Sep. 16, 2021

(30) Foreign Application Priority Data

Mar. 10, 2020 (CN) .......................... 202010160621.1

(51) Int. Cl.
G01N 23/227 (2018.01)
G01N 23/2273 (2018.01)
(52) U.S. Cl.
CPC . G01N 23/2273 (2013.01); G01N 2223/3037 (2013.01)
(58) Field of Classification Search
CPC ...... G01N 23/00; G01N 23/22; G01N 23/227; G01N 23/2273; G01N 2223/3037; G01B 15/02
See application file for complete search history.

(56) References Cited

U.S. PATENT DOCUMENTS 6,891,158 B2    5/2005    Larson et al.
7,361,613 B2    4/2008    Hori et al.
(Continued)

FOREIGN PATENT DOCUMENTS

CN    1774611 A    5/2006
CN    1832123 A    9/2006
(Continued)

OTHER PUBLICATIONS

International Search Report cited in PCT/CN2021/079864 dated Mar. 10, 2021, 12 pages.

Primary Examiner — Jurie Yun
(74) Attorney, Agent, or Firm — Cooper Legal Group, LLC

(57) ABSTRACT

The present application relates to a method for detecting the stability of an X-ray photoelectron spectrometer, comprising: obtaining a first upper limit value and a first lower limit value of a rate of oxygen and nitrogen contents of a calibrating wafer having a silicon oxynitride film formed on its surface; measuring the calibrating wafer by the X-ray photoelectron spectrometer to obtain a first test value of the rate of oxygen and nitrogen contents; and when the first test value is between the first upper limit value and the first lower limit value, considering that the photoelectron spectrometer can accurately test the nitrogen content of the monitor wafer since the value of the nitrogen content of the monitor wafer obtained by the X-ray photoelectron spectrometer is within the normal fluctuation range, and determining that the X-ray photoelectron spectrometer is stable.

11 Claims, 5 Drawing Sheets

Obtain a first upper limit value and a first lower limit value of a rate of oxygen and nitrogen contents of a calibrating wafer — S102

Obtain a first test value of the rate of oxygen and nitrogen contents of the calibrating wafer — S104

Determine whether the X-ray photoelectron spectrometer is stable by the first test value, the first upper limit value and the first lower limit value — S106

(56) References Cited

U.S. PATENT DOCUMENTS

| | | | |
|---|---|---|---|
| 9,425,109 | B2 | 8/2016 | Cheng et al. |
| 9,460,974 | B1 | 10/2016 | Byun et al. |
| 10,030,971 | B2 | 7/2018 | Bozdog et al. |
| 10,533,961 | B2 | 1/2020 | Lee et al. |
| 2017/0194465 | A1 | 7/2017 | Sakata |

FOREIGN PATENT DOCUMENTS

| | | |
|---|---|---|
| CN | 102044459 B | 4/2014 |
| CN | 108475617 A | 8/2018 |
| CN | 108538738 A | 9/2018 |
| CN | 108966674 A | 12/2018 |
| CN | 209991941 U | 1/2020 |
| JP | 2007189083 A | 7/2007 |

METHODS FOR DETECTING STABILITY OF X-RAY PHOTOELECTRON SPECTROMETER

CROSS-REFERENCE TO RELATED APPLICATIONS

The present application claims the priority to Chinese Patent Application No. 202010160621.1, titled "Methods for detecting stability of x-ray photoelectron spectrometer", filed on Mar. 10, 2020, which is incorporated herein by reference in its entirety.

TECHNICAL FIELD

The present application relates to the technical field of semiconductors, and in particular, to a method for detecting the stability of an X-ray photoelectron spectrometer.

BACKGROUND

The silicon oxynitride film has good photoelectric properties, mechanical properties and chemical stability. The nitrogen content of the silicon oxynitride film directly affects the performance of the silicon oxynitride film. Therefore, the monitoring of the nitrogen content of the silicon oxynitride film is very important. Typically, the nitrogen content of the silicon oxynitride film is obtained by an X-ray photoelectron spectrometer (XPS). If the X-ray photoelectron spectrometer is not stable, the nitrogen content test of the silicon oxynitride film will cause an indication error.

SUMMARY

The present application provides a method for detecting the stability of an X-ray photoelectron spectrometer.

The method for detecting the stability of an X-ray photoelectron spectrometer comprises:

obtaining a first upper limit value and a first lower limit value of a rate of oxygen and nitrogen contents corresponding to a calibrating wafer having a silicon oxynitride film formed on its surface;

measuring the calibrating wafer by the X-ray photoelectron spectrometer to obtain a first test value of the rate of oxygen and nitrogen contents of the calibrating wafer; and determining that the X-ray photoelectron spectrometer is stable when the first test value of the rate of oxygen and nitrogen contents is between the first upper limit value and the first lower limit value;

wherein, the thickness of the silicon oxynitride film is less than 10 nm; the sum of a value of oxygen content, a value of nitrogen content, and a value of silica content of the silicon oxynitride film measured by the X-ray photoelectron spectrometer is 100%, the value of the oxygen content, the value of the nitrogen content, and the value of the silica content are all percentage values, and the ratio of oxygen and nitrogen contents is a ratio of the sum of the oxygen content and the nitrogen content corresponding to the calibrating wafer to the thickness of the silicon oxynitride film.

The details of one or more embodiments of the present application will be set forth in the following drawings and description. Other features, purposes and advantages of the present application will become apparent from the description, drawings and claims.

BRIEF DESCRIPTION OF THE DRAWINGS

In order to better describe and illustrate the embodiments of the present application, reference may be made to one or more drawings. However, the additional details or examples used to describe the drawings should not be considered as any limitation to the concept of the present application or any one of the currently described embodiments or preferred implementations.

DETAILED DESCRIPTION

Figure 1:
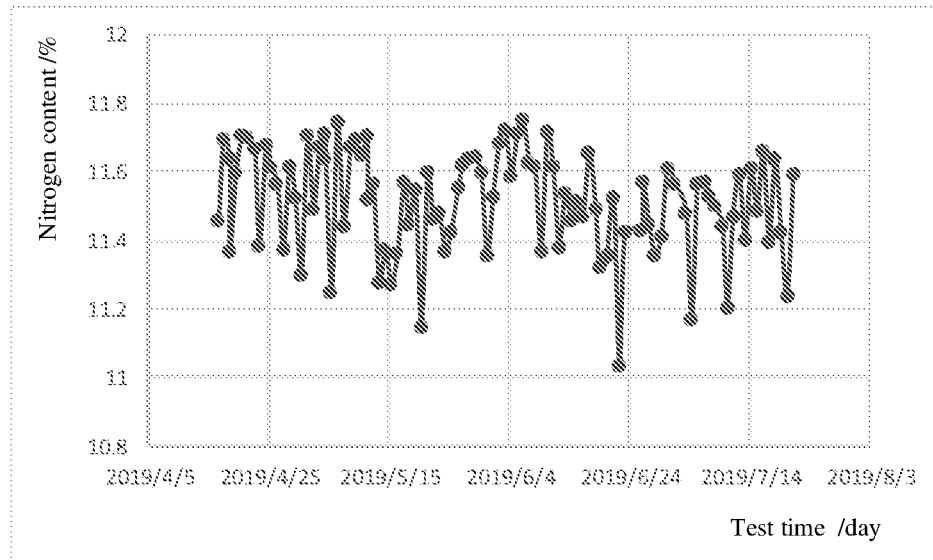
FIG. 1 is a graph showing the change in the value of the nitrogen content, which is obtained by testing the monitor wafer by the X-ray photoelectron spectrometer, as function of test time.

In order to facilitate the understanding of the present application, the present application will be described more fully below with reference to the relevant drawings. Preferred embodiments of the present application are shown in the drawings. However, the present application may be implemented in many different forms and is not limited to the embodiments described herein. On the contrary, these embodiments are provided to make the disclosure of the present application more thorough and comprehensive.

Unless otherwise defined, all technical and scientific terms used herein have the same meaning as commonly understood by a person of ordinary skill in the art to which the present application belongs. Here, terms used in the description of the present application are merely intended to describe specific embodiments, rather than limiting the present application. As used herein, the term "and/or" includes any or all of one or more associated listed items or combinations thereof.

It should be understood that, when an element or layer is referred to as being "located on", "adjacent to", "connected to" or "coupled to" other elements or layers, it may be located on, adjacent to, connected to, or coupled to other elements or layers directly or with intervening elements or layers therebetween. In contrast, when an element is referred to as being "directly located on", "directly adjacent to", "directly connected to" or "directly coupled to" other elements or layers, there are no intervening elements or layers therebetween. It should be understood that, although the terms first, second, third, etc., may be used to describe various elements, components, regions, layers and/or sections, these elements, components, regions, layers and/or sections should not be limited by these terms. These terms are only used to distinguish one element, component, region, layer or section from another element, component, region, layer or section. Therefore, without departing from the teachings of the present application, the first element, component, region, layer or section to be discussed below may be represented as a second element, component, region, layer or section.

Spatial relationship terms, such as "under", "below", "lower", "beneath", "above", "upper", etc., may be used here for the convenience of description to describe the relationship between an element or feature shown in the drawings and other elements or features. It should be understood that, in addition to the orientations shown in the drawings, the spatial relationship terms are intended to include different orientations of devices in use and operation. For example, if a device in the drawings is turned over, then elements or features described as being "below" or "beneath" or "under" other elements will be oriented "on" the other elements or features. Therefore, the exemplary terms "below" and "under" may include both upward orientation and downward orientation. The device may be otherwise oriented (rotated by 90 degrees or in other orientations) and the spatial descriptions used here are interpreted accordingly.

The terms used here are only to describe specific embodiments, not as any limitation to the present application. When used herein, the singular forms of "a", "an" and "the" are intended to include plural forms, unless otherwise stated. It should be understood that the terms "including" and/or "comprising", when used in this specification, determine the existence of the described features, integers, steps, operations, elements and/or components, but do not exclude the existence or addition of one or more other features, integers, steps, operations, elements, components, and/or groups. As used herein, the term "and/or" includes any and all combinations of related listed items.

The embodiments of the present application will be described here with reference to cross-sectional views which are schematic views of ideal embodiments (and intermediate structures) of the present application. In this way, changes from the shown shape due to, for example, manufacturing technology and/or tolerance may be expected. Therefore, the embodiments of the present application should not be limited to the specific shapes of the regions shown here, but include shape deviations due to, for example, manufacturing technology. For example, an injection region shown as a rectangle usually has round or curved features and/or injection concentration gradients at its edges, rather than a binary change from an injection region to a non-injection region. Likewise, a buried region formed by the injection may result in some injection in regions between the buried region and a surface through which the injection proceeds. Therefore, regions shown in the drawings are schematic in nature, and their shapes are not intended to show the actual shape of the regions of the device and are not intended to limit the scope of the present application.

When atoms are irradiated with X-rays, if the X-ray energy is greater than the inner Z orbital electron binding energy Eb, the Z electrons may be ionized into free electrons, i.e., photoelectrons. According to the principle of conservation of energy, the kinetic energy of electrons is $Ek=hv-Eb$, where Ek is the kinetic energy of photoelectrons, h is Planck's constant, and v is the frequency of X-rays. The photoelectrons are emitted from the solid surface. Therefore, considering the work function $\psi$ that the electrons are free from the potential energy of the solid surface, the kinetic energy of electrons is $Ek=hv-Eb-\psi$. Different elements have different specific electron binding energy, and the electron binding energy Eb varies with the type of elements. Therefore, detecting the kinetic energy of photoelectrons can obtain the element type of the tested wafer. The photoelectrons of different elements have specific kinetic energy and may be used as the basis for determining the composition of the elements on the surface of the material.

The X-ray photoelectron spectrometer, as one of important surface analysis techniques, is an analytical instrument that is very sensitive to the surface of the tested wafer. The photoelectron generation process of the X-ray photoelectron spectrometer involves only one electron, so all of elements in the periodic table can generate photoelectrons and thus it can measure all elements. The photoelectron generation mechanism of the X-ray photoelectron spectrometer is simple, and the energy spectrum signal peak is simple and easy to distinguish. When the chemical environment of atoms changes, for example, in the oxidized state, the change in the photoelectron signal peak will not be very complicated. The X-ray photoelectron spectrometer can analyze elements on the surface of an object to be tested. If sufficient data is available, it can analyze the chemical state and valence of compounds, as well as conductor and non-conductor materials. By the X-ray photoelectron spectrometer, the element composition, element content and film thickness of ultra-thin films with a thickness of less than 10 nm can be analyzed.

The silicon oxynitride ($SiO_xN_y$) film, as an emerging thin film material, has good photoelectric properties, mechanical properties and chemical stability. It is a material obtained by mixing silicon oxide ($SiO_2$) and silicon nitride ($Si_3N_4$) in different proportions. By changing the mixing ratio of oxygen and nitrogen (x/y), the photoelectric and mechanical properties of the silicon oxynitride ($SiO_xN_y$) film can be changed.

Figure 2:
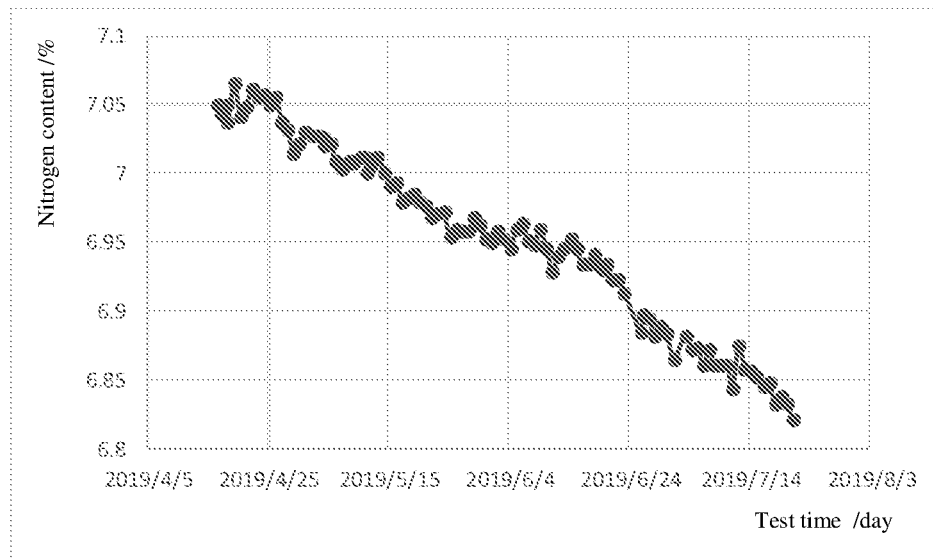
FIG. 2 is a graph showing the change in the value of the nitrogen content, which is obtained by testing the calibrating wafer by the X-ray photoelectron spectrometer, as function of test time.

In the semiconductor process, typically, the nitrogen content of the silicon oxynitride film is obtained by the X-ray photoelectron spectrometer (XPS). During the production process, the nitrogen content of a same calibrating wafer having a silicon oxynitride film formed on the surface is measured by the X-ray photoelectron spectrometer (XPS), and a determination is made on whether the X-ray photoelectron spectrometer is stable by the obtained value of the nitrogen content. Thus, a determination is made on whether the use of the X-ray photoelectron spectrometer can accurately test the value of the nitrogen content of the monitor wafer which is produced with the product in the silicon oxynitride film manufacturing process. It was found that, for a same X-ray photoelectron spectrometer, in a case where there was no abnormality in the silicon oxynitride film manufacturing process, the monitor wafer is tested by the X-ray photoelectron spectrometer, and the obtained value of the nitrogen content was within the normal fluctuation range (as shown in FIG. 1, the abscissa is the test time and the ordinate is the value of the nitrogen content of the monitor wafer). When testing a same calibrating wafer by this X-ray photoelectron spectrometer, the value obtained of the nitrogen content gradually decreases with the increase of time (as shown in FIG. 2, the abscissa is the test time and the ordinate is the value of the nitrogen content). Therefore, it is impossible to determine whether the X-ray photoelectron spectrometer is stable by the range of the nitrogen content of a certain calibrating wafer. It may be known by other means that the number of nitrogen atoms on the calibrating wafer has not disappeared with the increase of time.

Figure 3:
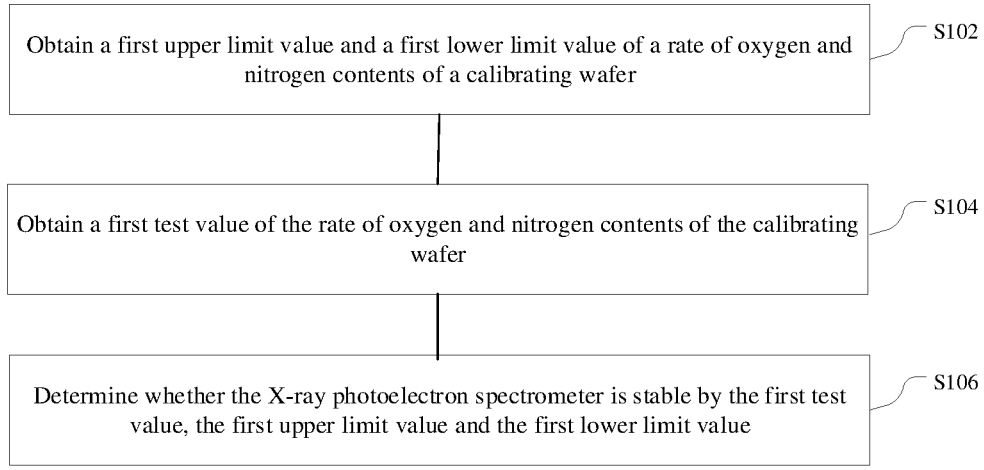
FIG. 3 is a flowchart of a method for detecting the stability of an X-ray photoelectron spectrometer in the first embodiment.

As shown in FIG. 3, in an embodiment, a method for detecting the stability of an X-ray photoelectron spectrometer is provided, comprising the following steps.

S102: A first upper limit value and a first lower limit value of a rate of oxygen and nitrogen contents of a calibrating wafer are obtained.

A first upper limit value and a first lower limit value of a rate of oxygen and nitrogen contents of a calibrating wafer having a silicon oxynitride film formed on its surface are obtained, wherein the thickness of the silicon oxynitride film is less than 10 nm; the sum of a value of an oxygen content, a value of a nitrogen content, and a value of a silica content of the silicon oxynitride film measured by the X-ray photoelectron spectrometer is 100%, the value of the oxygen content, the value of the nitrogen content, and the value of the silica content are all percentage values, and the rate of oxygen and nitrogen contents is a ratio of the sum of the oxygen content and the nitrogen content of the calibrating wafer to the thickness of the silicon oxynitride film.

In an embodiment, the thickness of the silicon oxynitride film is greater than or equal to 6.5 nm and less than or equal to 9.78 nm.

Figure 4:
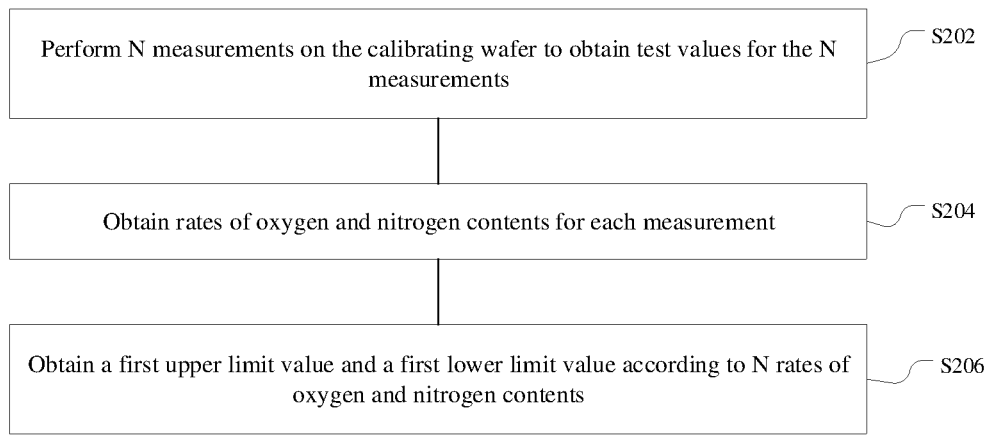
FIG. 4 is a flowchart of obtaining a first upper limit value and a first lower limit value of the rate of oxygen and nitrogen contents of the calibrating wafer in an embodiment.

As shown in FIG. 4, in an embodiment, the step S102 comprises the following steps.

S202: N measurements are performed on the calibrating wafer to obtain test values for the N measurements.

By the X-ray photoelectron spectrometer and with the difference between test times of two adjacent measurements as a first time interval, N measurements are performed on the calibrating wafer to obtain the value of the oxygen content, the value of the nitrogen content, the value of the silica content, and the value of the thickness of the silicon oxynitride film for each measurement, wherein N is an integer greater than or equal to 2.

In an embodiment, the first time interval is considered in days and the N is 30. In other embodiments, different first time intervals and different values of N are used according to actual needs.

S204: A rate of oxygen and nitrogen contents for each measurement is obtained.

A rate of oxygen and nitrogen contents for each measurement is obtained according to the ratio of the sum of the value of the oxygen content and the value of the nitrogen content to the value of the thickness of the silicon oxynitride film obtained in each measurement.

S206: A first upper limit value and a first lower limit value are obtained according to N rates of oxygen and nitrogen contents.

A first upper limit value and a first lower limit value of the rate of oxygen and nitrogen contents of the calibrating wafer are obtained according to N rates of oxygen and nitrogen contents of the calibrating wafer for the N measurements.

Figure 5:
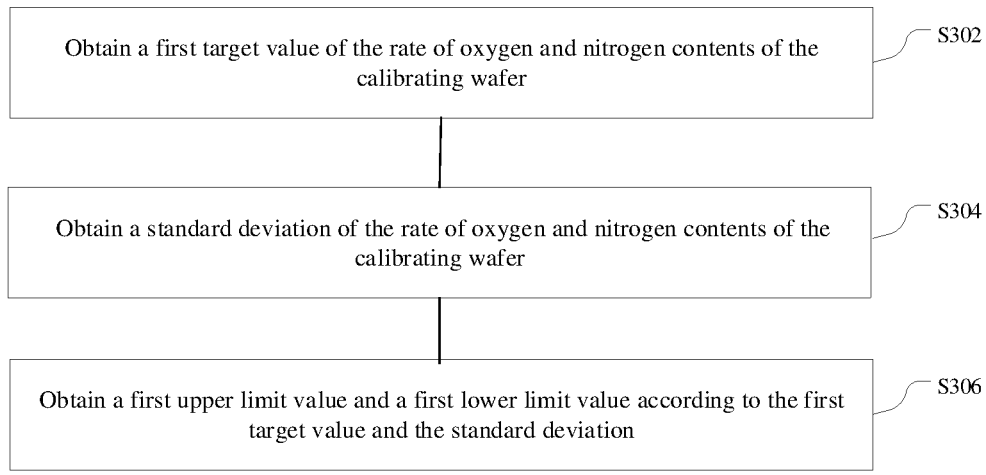
FIG. 5 is a flowchart of obtaining a first upper limit value and a first lower limit value according to N rates of oxygen and nitrogen contents in an embodiment.

As shown in FIG. 5, in an embodiment, the step S206 comprises the following steps.

S302: A first target value of the rate of oxygen and nitrogen contents of the calibrating wafer is obtained.

The N rates of oxygen and nitrogen contents is averaged to obtain a first target value of the rate of oxygen and nitrogen contents of the calibrating wafer.

S304: A standard deviation of the rate of oxygen and nitrogen contents of the calibrating wafer is obtained.

A standard deviation of the rate of oxygen and nitrogen contents is obtained according to the N rates of oxygen and nitrogen contents and the first target value.

S306: A first upper limit value and a first lower limit value are obtained according to the first target value and the standard deviation.

Figure 6:
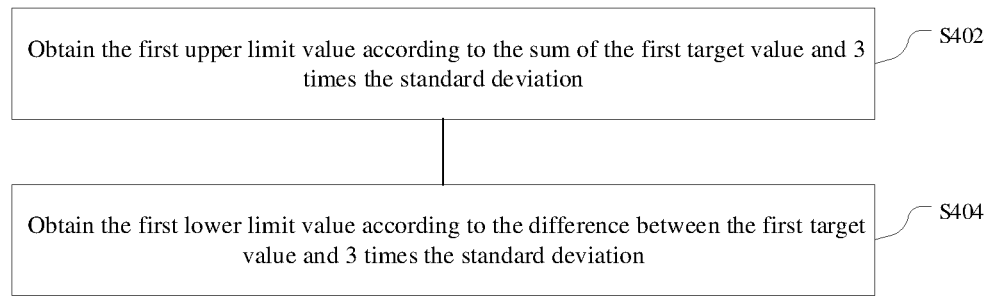
FIG. 6 is a flowchart of obtaining a first upper limit value and a first lower limit value according to the first target value and the standard deviation in an embodiment.

As shown in FIG. 6, in an embodiment, the step S306 comprises: S402: The first upper limit value is obtained according to the sum of the first target value and 3 times the standard deviation.

S404: The first lower limit value is obtained according to the difference between the first target value and 3 times the standard deviation.

S104: A first test value of the rate of oxygen and nitrogen contents of the calibrating wafer is obtained.

The calibrating wafer is measured by the X-ray photoelectron spectrometer to obtain a first test value of the rate of oxygen and nitrogen contents of the calibrating wafer.

S106: Whether the X-ray photoelectron spectrometer is stable is determined by the first test value, the first upper limit value and the first lower limit value.

Specifically, the first test value, the first upper limit value and the first lower limit value of the rate of oxygen and nitrogen contents are compared. It is determined that the X-ray photoelectron spectrometer is stable when the first test value of the rate of oxygen and nitrogen contents is between the first upper limit value and the first lower limit value.

In an embodiment, the step S106 further comprises the following steps.

It is determined that the X-ray photoelectron spectrometer is not stable when the first test value of the rate of oxygen and nitrogen contents is greater than the first upper limit value or less than the first lower limit value.

In an embodiment, the step S106 further comprises the following steps.

It is determined that the X-ray photoelectron spectrometer is not stable when the product of the first test value of the rate of oxygen and nitrogen contents and 10 is greater than the product of the first upper limit value and 10 or less than the product of the first lower limit value and 10.

Figure 7:
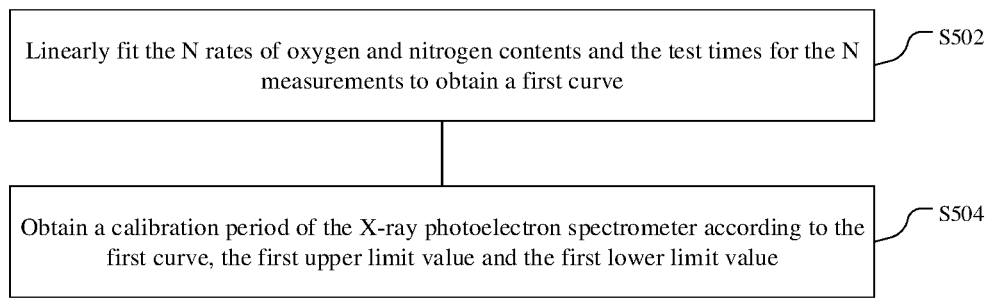
FIG. 7 is a flowchart of a method for detecting the stability of an X-ray photoelectron spectrometer in the second embodiment.

As shown in FIG. 7, in an embodiment, the method further comprises the following steps.

S502: The N rates of oxygen and nitrogen contents and the test times for the N measurements are linearly fitted to obtain a first curve.

S504: A calibration period of the X-ray photoelectron spectrometer is obtained according to the first curve, the first upper limit value and the first lower limit value.

Figure 8:
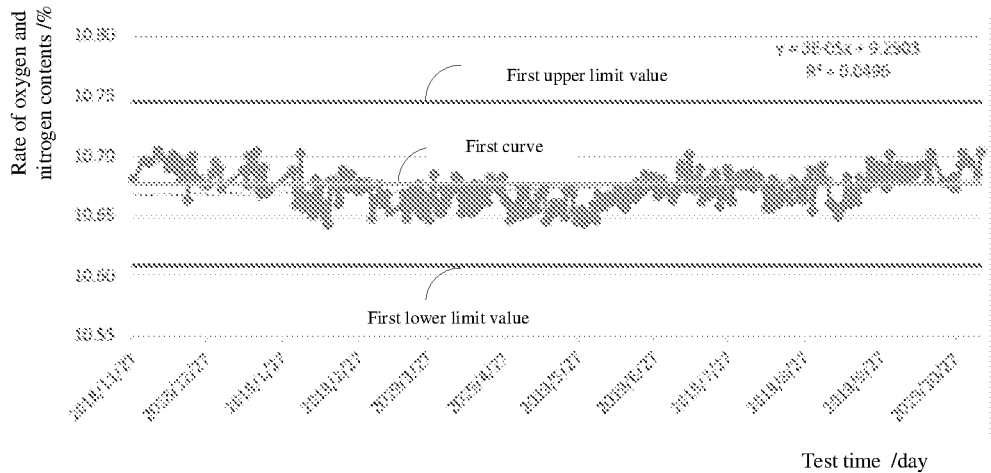
FIG. 8 is a schematic view of a first curve obtained in an embodiment.

FIG. 8 is a schematic view of a first curve obtained in an embodiment, wherein the first curve between the rate of oxygen and nitrogen contents and the test time is y=3E−05x+9.2603, the slope of the first curve is 0.00003. The nitrogen content obtained by N measurements and the corresponding test time are linearly fitted, and the slope of the obtained fitted curve is −0.0025, with a difference of about 80 times between the two. It is assumed that the total thickness of the calibrating wafer will never exceed 10 nm. In this case, if it is necessary to redefine the upper limit value and the lower limit value of the nitrogen content of the calibrating wafer corresponding to the X-ray photoelectron spectrometer every four months so that a determination can be made on whether the X-ray photoelectron spectroscopy is stable by testing the nitrogen content of the calibrating wafer, then a determination can be made on whether the X-ray photoelectron spectroscopy is stable by the rate of oxygen and nitrogen contents of the calibrating wafer. The time to redefine the upper limit value and the lower limit value of the nitrogen content of the calibrating wafer corresponding to the X-ray photoelectron spectrometer may be delayed by 80 times, which is 4*80=320 months (26 years).

This can eliminate the interference to the determination on whether the X-ray photoelectron spectroscopy is stable, which is caused by the self-oxidation of the silicon oxynitride film of the calibrating wafer.

Figure 9:
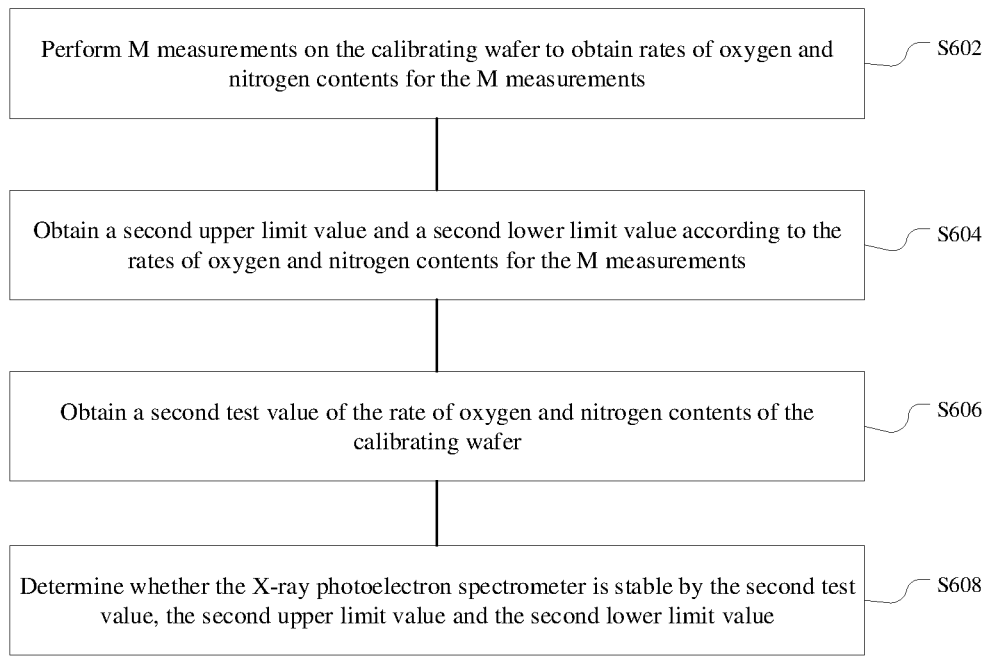
FIG. 9 is a flowchart of a method for detecting the stability of an X-ray photoelectron spectrometer in the third embodiment.

As shown in FIG. 9, in an embodiment, the method further comprises the following steps.

S602: M measurements are performed on the calibrating wafer to obtain rates of oxygen and nitrogen contents for the M measurements.

By the X-ray photoelectron spectrometer and with the difference between test times of two adjacent measurements as a second time interval, M measurements are performed on the calibrating wafer to obtain rates of oxygen and nitrogen contents for the M measurements, wherein M is an integer greater than or equal to 2.

S604: A second upper limit value and a second lower limit value are obtained according to the rates of oxygen and nitrogen contents for the M measurements.

A second upper limit value and a second lower limit value of the rate of oxygen and nitrogen contents of the calibrating wafer are obtained according to the rates of oxygen and nitrogen contents obtained in the M measurements.

S606: A second test value of the rate of oxygen and nitrogen contents of the calibrating wafer is obtained.

The calibrating wafer is measured by the X-ray photoelectron spectrometer to obtain a second test value of the rate of oxygen and nitrogen contents of the calibrating wafer.

S608: Whether the X-ray photoelectron spectrometer is stable is determined by the second test value, the second upper limit value and the second lower limit value.

It is determined that the X-ray photoelectron spectrometer is stable when the second test value of the rate of oxygen and nitrogen contents is between the second upper limit value and the second lower limit value.

The steps S602-S608 show the periodic calibration of the X-ray photoelectron spectrometer. By the second target value, the second upper limit value and the second lower limit value of the rate of oxygen and nitrogen contents obtained by the periodic calibration, it is determined that the X-ray photoelectron spectrometer is stable when the second test value of the rate of oxygen and nitrogen contents is between the second upper limit value and the second lower limit value. Meanwhile, by the second test value of the rate of oxygen and nitrogen contents and the second target value of the rate of oxygen and nitrogen contents, the test accuracy at which the nitrogen content of the monitor wafer is tested by the X-ray photoelectron spectrometer can be obtained. The obtained test accuracy is closer to the true accuracy during the test.

Figure 10:
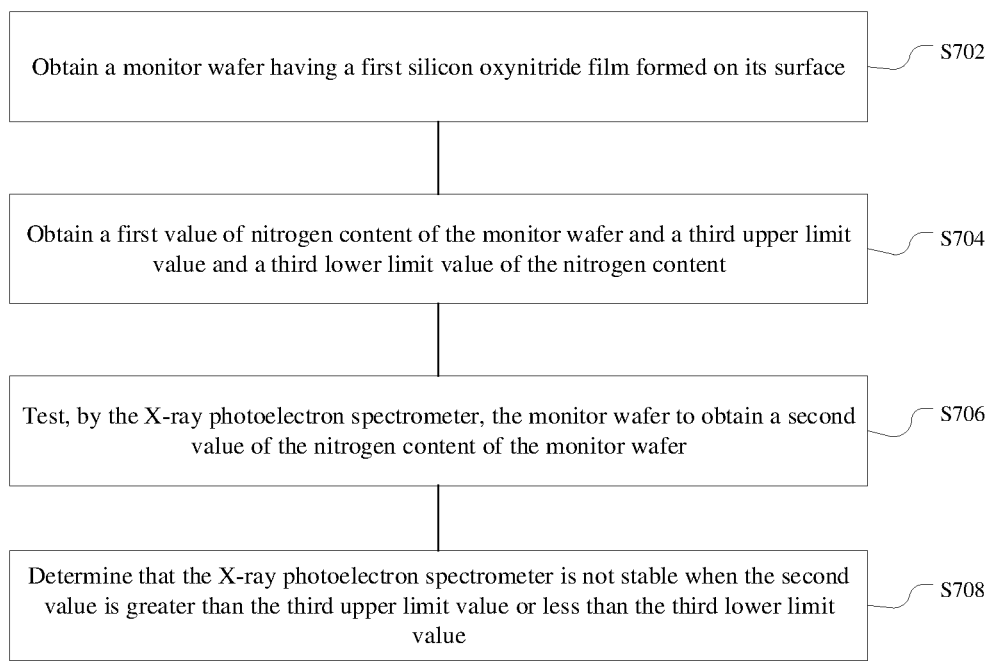
FIG. 10 is a flowchart of a method for detecting the stability of an X-ray photoelectron spectrometer in the fourth embodiment.

As shown in FIG. 10, in an embodiment, the method further comprises the following steps.

S702: A monitor wafer having a first silicon oxynitride film formed on its surface is obtained.

A first value of nitrogen content of the monitor wafer and a third upper limit value and a third lower limit value of the nitrogen content are obtained.

S706: By the X-ray photoelectron spectrometer, the monitor wafer is tested to obtain a second value of the nitrogen content of the monitor wafer.

S708: It is determined that the X-ray photoelectron spectrometer is not stable when the second value is greater than the third upper limit value or less than the third lower limit value.

The method for detecting the stability of an X-ray photoelectron spectrometer comprises: obtaining a first upper limit value and a first lower limit value of a rate of oxygen and nitrogen contents of a calibrating wafer having a silicon oxynitride film formed on its surface; measuring the calibrating wafer by the X-ray photoelectron spectrometer to obtain a first test value of the rate of oxygen and nitrogen contents; and determining that the X-ray photoelectron spectrometer is stable when the first test value of the rate of oxygen and nitrogen contents is between the first upper limit value and the first lower limit value, wherein, the thickness of the silicon oxynitride film is less than 10 nm; and the rate of oxygen and nitrogen contents is a ratio of the sum of the oxygen content and the nitrogen content of the calibrating wafer to the thickness of the silicon oxynitride film. By measuring the calibrating wafer by the X-ray photoelectron spectrometer after obtaining a first upper limit value and a first lower limit value of a rate of oxygen and nitrogen contents of a calibrating wafer having a silicon oxynitride film formed on its surface, when the first test value of the rate of oxygen and nitrogen contents of the calibrating wafer is between the first upper limit value and the first lower limit value, it is considered that the photoelectron spectrometer can accurately test the nitrogen content of the monitor wafer since the value of the nitrogen content of the monitor wafer obtained by the X-ray photoelectron spectrometer is within the normal fluctuation range, and it is thus determined that the X-ray photoelectron spectrometer is stable.

Various technical features of the above embodiments can be arbitrarily combined. For simplicity, all possible combinations of various technical features of the above embodiments are not described. However, all those technical features shall be included in the protection scope of the present application if not conflict.

The embodiments described above merely represent certain implementations of the present application. Although those embodiments are described in more specific details, it is not to be construed as any limitation to the scope of the present application. It should be noted that, for a person of ordinary skill in the art, a number of variations and improvements may be made without departing from the concept of the present application, and those variations and improvements should be regarded as falling into the protection scope of the present application. Therefore, the protection scope of the present application should be subject to the appended claims.

The invention claimed is:

1. A method for detecting stability of an X-ray photoelectron spectrometer, comprising:
obtaining a first upper limit value and a first lower limit value of a rate of oxygen and nitrogen contents of a calibrating wafer having a silicon oxynitride film formed on a surface of the calibrating wafer;
measuring the calibrating wafer by the X-ray photoelectron spectrometer to obtain a first test value of the rate of oxygen and nitrogen contents of the calibrating wafer; and
determining that the X-ray photoelectron spectrometer is stable when the first test value of the rate of oxygen and nitrogen contents is between the first upper limit value and the first lower limit value;
wherein, a thickness of the silicon oxynitride film is less than 10 nm; a sum of a value of an oxygen content, a value of a nitrogen content, and a value of a silica content of the silicon oxynitride film measured by the X-ray photoelectron spectrometer is 100%, the value of the oxygen content, the value of the nitrogen content, and the value of the silica content are all percentage values, and the rate of oxygen and nitrogen contents is a ratio of a sum of the oxygen content and the nitrogen content of the calibrating wafer to the thickness of the silicon oxynitride film.

2. The method according to claim 1, wherein the step of obtaining a first upper limit value and a first lower limit value of a rate of oxygen and nitrogen contents of a calibrating wafer having a silicon oxynitride film formed on a surface of the calibrating wafer comprises:

performing, by the X-ray photoelectron spectrometer, N measurements on the calibrating wafer, and serving a difference between test times of two adjacent measurements as a first time interval, to obtain the value of the oxygen content, the value of the nitrogen content, the value of the silica content, and a value of the thickness of the silicon oxynitride film for each measurement;

obtaining a rate of oxygen and nitrogen contents for each measurement, according to a ratio of a sum of the value of the oxygen content and the value of the nitrogen content to the value of the thickness of the silicon oxynitride film obtained in each measurement; and obtaining the first upper limit value and the first lower limit value of the rate of oxygen and nitrogen contents of the calibrating wafer, according to N rates of oxygen and nitrogen contents of the calibrating wafer for the N measurements;

wherein, N is an integer greater than or equal to 2.

3. The method according to claim 2, wherein, the step of obtaining the first upper limit value and the first lower limit value of the rate of oxygen and nitrogen contents of the calibrating wafer according to N rates of oxygen and nitrogen contents of the calibrating wafer for the N measurements comprises:

averaging the N rates of oxygen and nitrogen contents to obtain a first target value of the rate of oxygen and nitrogen contents of the calibrating wafer;

obtaining a standard deviation of the rate of oxygen and nitrogen contents of the calibrating wafer according to the N rates of oxygen and nitrogen contents and the first target value; and obtaining the first upper limit value and the first lower limit value according to the first target value and the standard deviation.

4. The method according to claim 3, wherein the step of obtaining the first upper limit value and the first lower limit value according to the first target value and the standard deviation comprises:

obtaining the first upper limit value according to a sum of the first target value and 3 times the standard deviation; and obtaining the first lower limit value according to a difference between the first target value and 3 times the standard deviation.

5. The method according to claim 2, wherein the first time interval is considered in days and the N is 30.

6. The method according to claim 2, further comprising:

linearly fitting the N rates of oxygen and nitrogen contents and the test times for the N measurements to obtain a first curve; and obtaining a calibration period of the X-ray photoelectron spectrometer according to the first curve, the first upper limit value and the first lower limit value.

7. The method according to claim 1, further comprising:

performing, by the X-ray photoelectron spectrometer, M measurements on the calibrating wafer, and serving a difference between test times of two adjacent measurements as a time interval, to obtain rates of oxygen and nitrogen contents for the M measurements;

obtaining a second upper limit value and a second lower limit value of the rate of oxygen and nitrogen contents of the calibrating wafer, according to the rates of oxygen and nitrogen contents obtained in the M measurements;

measuring the calibrating wafer by the X-ray photoelectron spectrometer to obtain a second test value of the rate of oxygen and nitrogen contents of the calibrating wafer; and determining that the X-ray photoelectron spectrometer is stable when the second test value of the rate of oxygen and nitrogen contents is between the second upper limit value and the second lower limit value, wherein, M is an integer greater than or equal to 2.

8. The method according to claim 1, wherein the step of determining that the X-ray photoelectron spectrometer is stable when the first test value of the rate of oxygen and nitrogen contents is between the first upper limit value and the first lower limit value comprises:

determining that the X-ray photoelectron spectrometer is not stable when the first test value of the rate of oxygen and nitrogen contents is greater than the first upper limit value or less than the first lower limit value.

9. The method according to claim 1, wherein the step of determining that the X-ray photoelectron spectrometer is stable when the first test value of the rate of oxygen and nitrogen contents is between the first upper limit value and the first lower limit value comprises:

determining that the X-ray photoelectron spectrometer is not stable when a product of the first test value of the rate of oxygen and nitrogen contents and 10 is greater than a product of the first upper limit value and 10 or less than a product of the first lower limit value and 10.

10. The method according to claim 1, further comprising:

obtaining a monitor wafer having a first silicon oxynitride film formed on a surface of the monitor wafer;

obtaining a first value of nitrogen content of the monitor wafer and a first upper limit value and a first lower limit value of the nitrogen content of the monitor wafer;

testing, by the X-ray photoelectron spectrometer, the monitor wafer to obtain a second value of the nitrogen content of the monitor wafer; and determining that the X-ray photoelectron spectrometer is not stable when the second value is greater than the first upper limit value or less than the first lower limit value of the nitrogen content of the monitor wafer.

11. The method according to claim 1, wherein the thickness of the silicon oxynitride film is greater than or equal to 6.5 nm and less than or equal to 9.78 nm.

* * * * *